US006195088B1

(12) United States Patent
Signes

(10) Patent No.: US 6,195,088 B1
(45) Date of Patent: Feb. 27, 2001

(54) METHOD AND SYSTEM FOR CONTROLLING MULTIMEDIA STREAMS USING DYNAMIC PROTOTYPES

(75) Inventor: Julien Signes, San Francisco, CA (US)

(73) Assignee: France Telecom, Issy Moulineaux (FR)

( * ) Notice: Subject to any disclaimer, the term of this patent is extended or adjusted under 35 U.S.C. 154(b) by 0 days.

(21) Appl. No.: 09/205,192

(22) Filed: Dec. 4, 1998

(51) Int. Cl.[7] ................................................... G06T 17/00
(52) U.S. Cl. ............................................................. 345/302
(58) Field of Search .................................. 345/302, 420, 345/433, 473

(56) References Cited

U.S. PATENT DOCUMENTS

| 5,956,039 | * | 9/1999 | Woods et al. | 345/419 |
| 5,999,944 | * | 12/1999 | Lipkin | 707/104 |
| 6,002,803 | * | 12/1999 | Qian et al. | 382/242 |
| 6,031,548 | * | 2/2000 | Gueziec et al. | 345/440 |
| 6,031,872 | * | 2/2000 | Han | 375/240 |

OTHER PUBLICATIONS

Berekovic, "An array processor architecture with parallel date cache for image rendering and compositing", Computer Graphics International, 1998. Proceedings, Jun. 28, 1998, pp. 411–414.*

Mulroy, "VRML gets real the MPEG–4 way", Teleconferencing Futures (Digest No.: 1997/121), Colloquium on, Jun. 17, 1997, pp. 4/1–4/4.*

* cited by examiner

Primary Examiner—Stephen S. Hong
(74) Attorney, Agent, or Firm—Oblon, Spivak, McClelland, Maier & Neustadt, P.C.

(57) ABSTRACT

A method and system for encoding multimedia content using dynamic interfaces. By providing an extendable, programmatic interface to the content of a scene, a scene may be more efficiently encoded than a scene in which each characteristic of each object in the scene is explicitly specified in the video stream for each frame. Exemplary scene characteristics that can be encoded include quantizing values, animation parameters and update parameters.

3 Claims, 3 Drawing Sheets

```
InterfaceDeclaration() {
        //Specific declaration information...
        InterfaceCodingTable();
}

InterfaceCodingTable() {
        InterfaceCodingMask;
        InterfaceCodingParameters;
}

InterfaceCodingMask() {
        boolean useQuant;
boolean useUpdate;
        boolean useAnim;
}

InterfaceCodingParameters() {
        for (I =0; I < interface.NbParameters; I++) {
            if (useQuant) {
                int quantCategory;
                QuantParameter(quantCategory);
            }
            if (useUpdate) {
                boolean isUpdatable;
            }
            if (useAnim) {
                boolean isDyn;
                if (isDyn) {
                    int animCategory;
                }
            }
        }

METHOD AND SYSTEM FOR CONTROLLING MULTIMEDIA STREAMS USING DYNAMIC PROTOTYPES

CROSS-REFERENCE TO CO-PENDING APPLICATIONS

The present application is related to the following applications both filed on even date herewith: (1) "Method and System for Predictive Encoding of Arrays of Data," Ser. No. 09/205,191, now U.S. Pat. No. 6,075,901 and (2) "Method and System for Encoding Rotations and Normals in 3D Generated Scenes," Ser. No. 09/205,190. Both applications name Julien Signes and Olivier Ondet as inventors, and those applications are incorporated herein by reference.

BACKGROUND OF THE INVENTION

1. Field of the Invention

The present invention relates to an improved method of encoding computer-generated image sequences, and more particularly to the use of prototypes for encoding how portions of a video stream are to be quantized, animated or otherwise updated.

2. Discussion of the Background

Although many computer-generated images were previously generated by specifying every pixel in every frame together, modern computer image sequences often are created by merging plural multimedia objects (e.g., video and 2D- or 3D- graphics primitives)—sometimes with one or more sound tracks. In the area of multimedia, images and/or scenes are composed using a language. For instance, the HyperText Markup Language (HTML) specifies the two-dimensional (2D) composition of text and graphics. Similarly, the Virtual Reality Markup Language (VRML) describes three-dimensional (3D) worlds.

Multimedia languages also now include extensions for dynamic alteration of the composed images. HTML now includes Dynamic HTML (DHTML) extensions, such as are described in *Dynamic HTML: The Definitive Reference*, by Danny Goodman, published by O'Reilly & Associates, Inc., 1998, the contents of which are incorporated herein by reference. Moreover, XML extensions for HTML provide a meta-language to describe how the native language is to be modified or extended.

Similarly, VRML includes support for "PROTO" definitions which enable new primitives to be "prototyped." Part of a definition is a code block or plural code blocks that are executed by the VRML environment to provide the newly prototyped functionality.

The Motion Pictures Expert Group (MPEG) was formed to investigate the technologies required for the encoding and decoding of image streams. The resulting standard (now referred to as "MPEG-1") has served as a basis for two additional MPEG standards: MPEG-2 and MPEG-4. MPEG-4 is a standard that is "in progress." The final committee drafts are ISO/IEC FCD 14496-1 MPEG-4 Systems and -2 MPEG-4 Visual, the contents of the final committee drafts are incorporated herein by reference. Those drafts include various methods of encoding multimedia content. Such methods include: (1) quantization methods for scene parameters, (2) animation streams for encoding and transmitting multimedia scenes, and (3) update streams to modify the multimedia information over time. The finalized draft of MPEG-4 includes support for: (1) quantization in Binary Format for Scenes (hereinafter "BIFS"), (2) animation using BIFS (hereinafter "BIFS-Anim") and (3) update control using BIFS (hereinafter "BIFS-Command").

Using quantization under BIFS includes tagging nodes and fields with a quantization category. Each field of each node is assigned a quantization category, which is applied to the field when it is given a quantization parameter structure to parameterize during the quantization process.

BIFS-Anim defines an encoding method for streaming- and file-based animation of multimedia data. BIFS-Anim includes 3 basic components: (1) a scene graph, (2) an animation mask, and (3) animation frames. The scene includes (a) untagged objects that are static and (b) tagged objects that are to be modified. The animation mask sets the properties of the tagged objects that are to be modified by the animation stream.

The BIFS Command is a protocol to update BIFS nodes and a scene graph. It enables the transportation of changes to the scene by sending commands to replace the whole scene with another one, removing some of the tagged objects, or changing values of properties of tagged objects in the scene. cl SUMMARY OF THE INVENTION It is an object of the present invention to provide dynamic programming interfaces and/or extensions for a multimedia content lagnguage and/or a multimedia placement language.

It is a further object of the present invention to provide links to animation, modification and quantization methods and to provide new prototypes for scenes, such that scenes can be represented, animated and modified efficiently.

This and other objects of the present invention are addressed by one or more of (1) a computer-implemented method for encoding multimedia content using dynamic interfaces, (2) a system for encoding multimedia content using dynamic interfaces, and (3) a computer program product for encoding multimedia content using dynamic interfaces.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 3 is a pseudo-code example of an interface declaration.

DESCRIPTION OF THE PREFERRED EMBODIMENT

Figure 1:
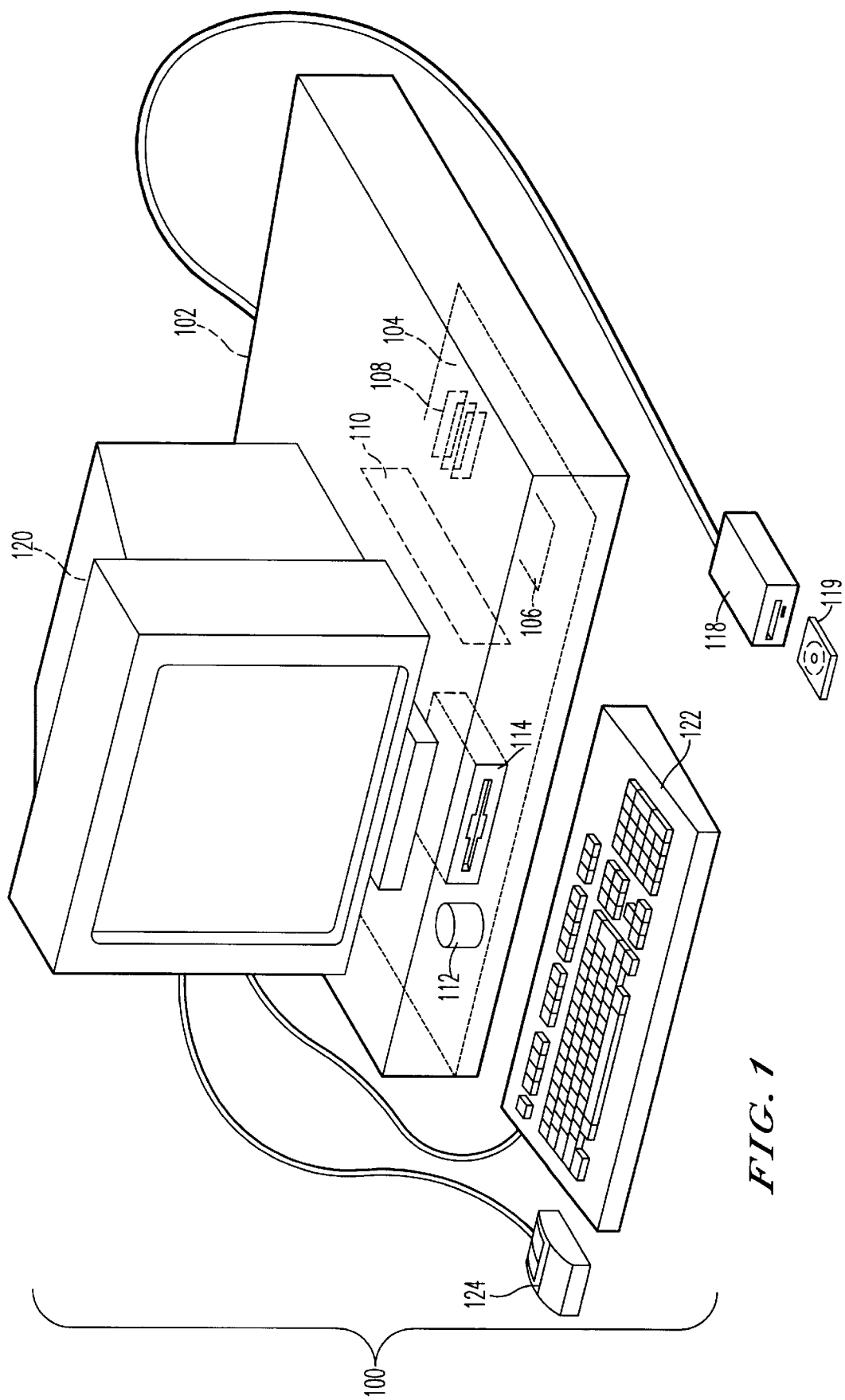
FIG. 1 is a schematic illustration of a computer for implementing the method of the present invention.

Referring now to the drawings, wherein like reference numerals designate identical or corresponding parts throughout the several views, FIG. 1 is a schematic illustration of a computer system for encoding multimedia content using dynamic interfaces. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In an alternate embodiment, the present invention is implemented as one of or as a combination of: (1) a set-top box, (2) a video board, and/or (3) a receiver/playback unit. In yet another alternative embodiment, a printer (not shown) provides printed listings of interfaces for encoding multimedia content.

The system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for encoding multimedia content using dynamic interfaces. The computer code devices of the present invention can be any interpreted or executable code mechanism, including but not limited to scripts, interpreters, dynamic link libraries, Java classes, and complete executable programs.

Figure 2:
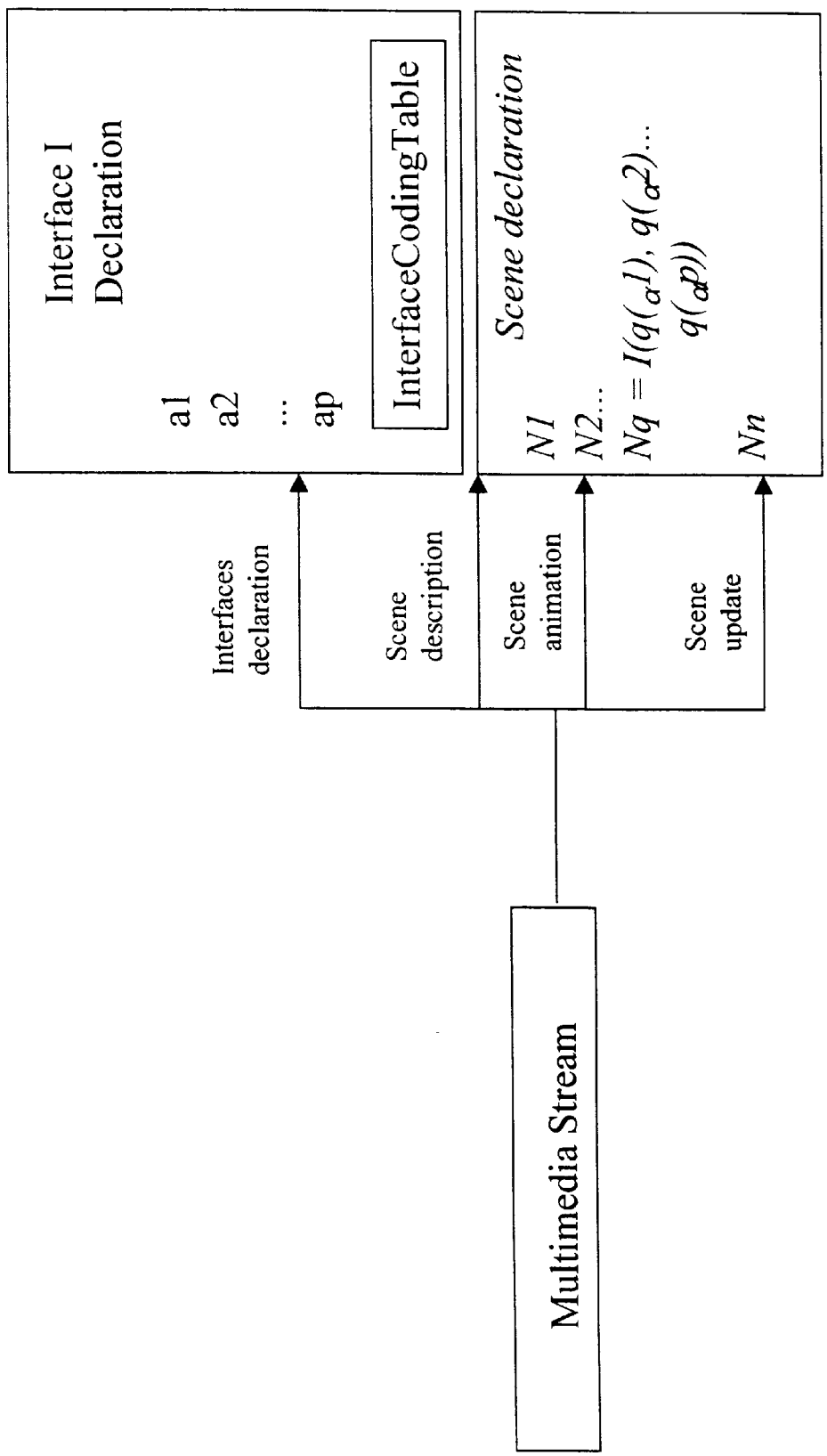
FIG. 2 is a block diagram of the inter-relationship between an interface declaration and a scene declaration.

As shown in FIG. 2, a multimedia stream is received by the present invention and decoded into scene components and interface components. The scene components include information on both (1) digital objects in the scene and (2) how those objects are updated or animated. The interface components include interface definitions that, after decoding, are stored internally, and, in one embodiment, the definitions are stored, at least partially, in an InterfaceCodingTable. In particular, the InterfaceCodingTable attaches to a new interface and stores coding elements of a given interface definition in order to apply methods (e.g., quantization, animation, and update methods) of the digital content language (e.g., MPEG-4 BIFS or VRML) to scene components.

An Interface Coding Table includes the following information: (1) an update mode, (2) an animation mode (or an Anim-mode), (3) a quantization category, (4) quantization parameters, and (5) an animation category. Using the update mode, any parameter can be declared as an "in" type. In languages (e.g., VRML) that support defining the types of parameters, either implicitly or explicitly, parameters need not be separately defined as "in" type. Specifically, VRML allows parameters to be defined as EventIn, ExposedField, EventOut, and Field. Both EventIn and ExposedField are, by definition, "in" type parameters. When used, an "in" type indicates that the interface may receive further updates from the multimedia stream (e.g., through an update stream such as a BIFS-Command stream). The Anim-mode may operate on any parameter in the interface, by tagging a parameter with the corresponding animation category. The Quant mode may also operate on any parameter in the interface, by tagging a parameter with the corresponding quantization category, and transmitting optional additional quantization parameters.

The multimedia streams can use the InterfaceCodingTable (ICT) information as follows: (1) to control quantization, (2) to update a portion of a corresponding interface, and (3) to perform animation through the interface. Specifically, a quantization category $qc[i]$ associated to an interface parameter $ai$ is applied using the ICT value $qp[i]$ as well as other contextual information from the scene. This enables the interface declaration to be compressed nearly optimally. Any given interface parameter $ai$ tagged in "in mode" may be modified by an update stream that will modify the values of the interface at a given point in time. The interface may be animated using a continuous animation stream to update continuously one of the values. The animation category $ac[i]$ is used in that case.

The InterfaceCodingTable is part of the Interface Declaration and has the structure shown by example in FIG. 3. Particular parameters are described below.

ICT mask: Mask of Boolean values to set which information is available for each parameter.

useQuant: Boolean to set whether a quantization parameter is sent for each parameter.

useUpdate: Boolean to set whether information on the "in mode" is sent for each parameter as well as the update category information. As described above, in languages that already support independently defining whether a parameter can be updated, this parameter is optional.

useAnim: Boolean to set whether information on the "dyn mode" and animation category is sent for each parameter.

Additional processing is performed for each parameter $ai$ in the interface. As described below with reference to the PROTOinterfaceDefinition, the number of parameters is specified in the variable "numFields." Thus, for each parameter, the following information is (optionally) specified:

In mode data: Information on whether this parameter of the interface is "updatable." This information may also come from the interface declaration.

quant category data: The quantization category to be used. This data is used when "useQuant" is true.

quant parameter data: The specific quantization parameters for this category: Min and max values, and information used for compression—according to the specific quantization/inverse quantization method of the category. This data is used when "useQuant" is true.

anim parameter data: The animation scheme chosen for the specific field. This data is used when "useAnim" is true.

In the context of MPEG-4 and VRML, the present invention enables new interfaces to be defined through PROTOs and EXTERNPROTOs. The only difference between PROTOs and EXTERNPROTOs is that the code implementing the interface is provided in the first case inside the same description (PROTO), while in the second case it is provided in an outside resource.

In both cases, the use of an ICT with the prototype declaration enables field declarations to be tagged with all the necessary parameters to encode, animate and update the node afterwards. In MPEG-4, the ICT includes the following information: (1) a quantization category (see Table 1), (2) an animation categrory (see Table 2), and (3) quantization parameters (including the minimum and maximum values for the field).

TABLE 1

Quantization Categories

| Category | Description |
|---|---|
| 0 | None |
| 1 | 3D position |
| 2 | 2D positions |
| 3 | Drawing order |
| 4 | SFColor |
| 5 | Texture Coordinate |
| 6 | Angle |
| 7 | Scale |
| 8 | Interpolator keys |
| 9 | Normals |
| 10 | Rotations |
| 11 | Object Size 3D (1) |
| 12 | Object Size 2D (2) |
| 13 | Linear Scalar Quantization |
| 14 | CoordIndex |
| 15 | Reserved |

TABLE 2

Animation Categories

| Category | Description |
|---|---|
| 0 | None |
| 1 | Position 3D |
| 2 | Positions 2D |
| 3 | Reserved |
| 4 | Color |
| 5 | Reserved |
| 6 | Angle |
| 7 | Float |
| 8 | BoundFloat |
| 9 | Normals |
| 10 | Rotation |
| 11 | Size 3D |
| 12 | Size 2D |
| 13 | Integer |
| 14 | Reserved |
| 15 | Reserved |

With this information along with the PROTO definition, an MPEG-4 terminal will be able to generate a Node Coding Table necessary to encode, update and animate a node. Below is a typical example of a NodeCodingTable for the DirectionalLight node. Min and max values as well as Quantization (Q) and Animation (A) types are provided. All the ids are automatically deducted from the field declaration. Node Data Types (SFWorldNode, SF3Dnode) and their corresponding ids are used to determine the context in which the node can be used. PROTOs receive a specific node category.

| | SF WorldNode | | | | 1000100 | | |
| --- | --- | --- | --- | --- | --- | --- | --- |
| | SF3DNode | | | | 10001 | | |
| DirectionalLight Field name | DEF id | IN id | OUT id | DYN id | [m, M] | Q | A |
| ambientIntensity | 000 | 000 | 000 | 00 | [0, 1] | 4 | 2 |
| color | 001 | 001 | 001 | 01 | [0, 1] | 4 | 2 |
| direction | 010 | 010 | 010 | 10 | | 9 | 6 |
| intensity | 011 | 011 | 011 | 11 | [0, 1] | 4 | 2 |
| on | 100 | 100 | 100 | | | | |

TABLE 4

MPEG-4 Types

| Bool | 0000 |
|---|---|
| Float | 0001 |
| Time | 0010 |
| String | 0011 |
| Int32 | 0100 |
| String | 0101 |
| Vec3f | 0110 |
| Vec2f | 0111 |
| Color | 1000 |
| Rotation | 1001 |

Binary Syntax

The following is the binary syntax for the the PROTO definition with the corresponding InterfaceCoding table. The binary bitstream syntax is specified following the MPEG-4 MSDL language.

1.0 PROTOdeclaration

```
PROTOdeclaration ( ) {
    PROTOinterfaceDefintion ( );
    PROTOcode ( );
    protoCodingTable ( );
}
```
2.0 PROTOinterfaceDefinition

```
class PROTOinterfaceDefinition {
    bit(idBits)   id;         // The ID used to refer to the PROTO.
    Bit(5)        type;       // Context type, using last 5 bits, Tbl 1.
    bit(4)        fieldBits;  // Number of specifying number of fields.
    bit (fieldBits)  numFields;
                              // Number of fields and events in the proto.
    for (i=0; i<numFields; ++i) {
        bit(2) eventType;     // eventIn, eventOut, field or
                              // exposedField
        bit(6) fieldType;     // The field type, using table 1.
    }
}
```
3.0 PROTOcode

```
class PROTOcode {
    bit(i) isExtern           // Is this an extern proto?
    if (isExtern) {           // Read URL for location of PROTO defs.
        MFUrl locations;
    } else {
        do {
            SFNode node (SFWorldNodeType, true);
            bit(1) moreNodes;
        } while (moreNodes);
    }
}
```
4.0 SFNode

```
class SFNode(int nodeDataType,boolean ISED) {
    bit(1) isReused;
    if (isReused) {
        bit (BIFSConfig.nodeIDbits) nodeID;
    }
    else {
        bit (GetNDTnbBits (nodeDataType)) localNodeType;
        nodeType = GetNodeType (nodeDataType, localNodeType);
        bit (1) isUpdateable;
        if (isUpdateable) {
            bit (BIFSConfig.nodeIDbits) nodeID;
        }
        bit (1) MaskAccess;
        if (MaskAccess) {
            if (ISED)
                isedMaskNodeDescription node (MakeNode
                                    (nodeDataType, nodeType));
            else
                MaskNodeDescription mnode (MakeNode
```

-continued
```
                                    (nodeDataType, nodeType));
        }
        else {
            if (ISED)
                isedListNodeDescription mnode (MakeNode
                                    (nodeDataType, nodeType));
            else
                ListNodeDescription lnode (MakeNode
                                    (nodeDataType, nodeType));
        }
    }
}
5.0 isedMaskNodeDescription class isedMaskNodeDescription(NodeData node) {
    for (i=0; i<node.numDEFfields; i++) {
        bit(1) Mask;
        if (Mask) {
            if (node.nodeType == PROTO) {
                bit(1) ISedField;
                if (IsedField)
                    bit (node.numDEFfields;) protoField;
                else
                    Field value(node.field[node.def2all[i]]);
            }
            else {
                Field value(node.field[node.def2all[i]]);
            }
        }
    }
}
6.0 isedListNodeDescription class isedListNodeDescription (NodeData node) {
    bit(1) endFlag;
    while (!EndFlag) {
        int (node.nDEFbits) fieldRef;
        if (node.nodeType == PROTO) {
            bit(1) ISedField;
            if (IsedField)
                bit (node.numDEFfields;) protoField;
            else
                Field value(node.field[node.def2all[i]]);
        }
        else {
            Field value(node.field[node.def2all[i]]);
            bit(1) endFlag;
        }
    }
}
7.0 protoCodingTable InterfaceCodingTable( ) {
        InterfaceCodingMask;
        InterfaceCodingParameters;
}
8.0 protoCodingMask InterfaceCodingMask ( ) {
        boolean useQuant;
        boolean useUpdate;
        boolean useAnim;
}
9.0 protoCodingParameters InterfaceCodingParameters ( ) {
    for (i =0; i < proto.NbdefFields; i++) {
        if (useQuant) {
            ui nt(4) quantCategory;
            if (quantCategory == 13)
                uint(5) nbBits;
            bit(1) hasMinMax;
            if (hasMinMax) {
                SFField(fieldType) minFieldvalue;
                SFField(fieldType) maxFieldvalue;
            }
        }
                // REM: Here we do not need an "isUpdatable"
                // since there is it automatically comes
                // from the "event and field type"
        if (useAnim) {
            boolean isDyn;
```
-continued
```
            if (isDyn) {
                uint (4) animcategory;
            }
        }
    }
}
```

An illustrative use of the present invention uses PROTOtypes in an MPEG-4 application to implement a collaborative professional application that enables multiple engineers to work simultaneously on a model/design (e.g., a boat model) from remote locations and still view the changes in real time. The engineers carry out experiments on the design and want all sites to obtain the experiment's results simultaneously, while using the most efficient compressed transmission to fit a low bit rate network connection. Moreover, the system should be generic enough to accommodate various designs. By using the MPEG-4 framework for this application, a generic and efficient framework is obtained for all the communication and application design, instead of designing a specific, and potentially sub-optimal, application for each case.

For this example, a 3D boat model including 10,000 polygons made with 20,000 vertices is assumed. In the experiment, engineers want to analyze and control the deformation of the boat resulting from certain winds. Generally the deformation would be controlled by several parameters, e.g., speed and direction of the wind, and the height of the waves. The boat is then defined as an MPEG-4 enhanced PROTO, and upon reception of new values, a Script inside the PROTO calculates the new vertices parameters. This way, the engineers may carry a live simulation and transmit, using the BIFS-Anim protocol only a few parameters coded optimally, instead of resending the 20,000 vertices. Additionally, each time new results are to be tested, the engineers need only transmit a new set of parameters using the BIFS-Command protocol.

Based on the example, the following PROTOtype may be defined:

```
PROTO WindBoat [
        exposedField      SFVec3f        windSpeed
        exposedField      SFVec3f        windOrientation
        exposedField      SFFloat        waveHeight
]{
        Script { # Changing vertices according to parameters
        }
        IndexedFaceSet { # The 3D Model of the boat
        }
}
```

ICT parameters
The following coding parameter may be associated in the ICT.

|  | Proto | | | | 10001 | | |
|---|---|---|---|---|---|---|---|
| WindBoat Field name | DEF id | IN id | OUT id | DYN id | [m, M] | Q | A |
| windSpeed | 00 | 00 | 00 | 00 | [−I, +I] | 11 | 1 |
| windOrientation | 01 | 01 | 01 | 01 | [0, 1] | 9 | 9 |
| waveHeight | 10 | 10 | 10 | 10 | [0, 100] | 13 8 | 11 |

In addition to adding functionality, the present invention produces more efficiently coded bit streams. Comparisions of bit rates can be made by comparing information transmitted without and with using the PROTO interface. Gain can be measured for a PROTO instantiation (putting a boat in a scene), for a PROTO update (change remotely values), or for animation. The size in bytes for each data to be transmitted is compared. Note that if ordinary PROTOs without ICT were used, then the update and animation functionality is not available.

| Experiment | Raw Data Size (bytes) | VRML PROTO data Size(bytes) | MPEG-4 BIFS PROTO Size (bytes) |
|---|---|---|---|
| Instantiation (n boats in scene) | n*400,000 | 400,000 + 35*n | 30,000 + n*5 |
| Update | 240,000 | Not Available | 5 |
| Animation (per average anim frame) | 240,000 | Not Available | 3 |

As a second example, the present invention may be used to animate a bouncing ball. Rather than sending a command stream to update each polygon of the ball in each frame, an interface is created which controls the animation. The interface defines a parameter to control the height of the ball from the ground. In order to animate the ball, only the height parameter need be changed for each frame—the script of the interface performs the actual updating of the vertices. Similarly, if the ball interface included a second parameter for color, the color of each polygon would be changed by a script rather than by animating the colors of the polygons individually.

Although the present invention has been described above in terms of an interface extending the native methods provided by a language, the present invention is further directed to providing interfaces to interfaces. Just as objects may inherit behavior from super-classes, so may interfaces inherit functionality from earlier instantiated interfaces.

As would be evident to one of ordinary skill in the art, the method and system of the present invention may be practised other than explicitly setforth herein without departing from the spirit of the invention. Therefore, the specification is not intended to be limiting, and only the scope of the claims defines the limits of the invention.

What is claimed is:

1. A multimedia system for extending the native capabilities of a digital content language, the system comprising:
   a processor;
   a non-volatile memory including a digital content language with a set of native capabilities; and
   a reprogrammable memory for receiving digital objects and a prototype of an interface to be executed by the processor to extend the set of native capabilities of the digital content language, wherein the prototype of the interface defines a method of using at least one of (a) a quantization method for quantizing values, (b) streaming animation of the digital objects, and (c) streaming updates of the digital objects.

2. The system according to claim 1, wherein the digital content language is a virtual reality markup language that includes a prototype extension.

3. The system according to claim 2, further comprising a decoder for a final IMPEG-4 standard BIFS protocol, wherein the decoder transmits decoded values to the prototype of the interface.

* * * * *

UNITED STATES PATENT AND TRADEMARK OFFICE
CERTIFICATE OF CORRECTION

PATENT NO.     : 6,195,088 B1
DATED          : February 27, 2001
INVENTOR(S)    : Julien Signes It is certified that error appears in the above-identified patent and that said Letters Patent is hereby corrected as shown below:

<u>Title page,</u>
Item [57], ABSTRACT,
Lines 1 and 2, please delete "A method and system for encoding multimedia content using dynamic interfaces."

<u>Column 3,</u>
Line 58, change "Event1n" to -- EventIn --.
Line 59, change "Event1n" to -- EventIn --.

<u>Column 6,</u>
Line 42, change "(i)" to -- (1) --.

<u>Column 7,</u>
Line 55, change "ui nt" to -- unit --.

<u>Column 10,</u>
Line 31, change "IMPEG-4 standard" to -- MPEG-4 draft standard --.

Signed and Sealed this

First Day of April, 2003

JAMES E. ROGAN
*Director of the United States Patent and Trademark Office*